United States Patent
Frank et al.

(10) Patent No.: US 8,063,520 B2
(45) Date of Patent: Nov. 22, 2011

(54) ELECTRICAL MACHINE HAVING COOLING SYSTEM FOR A SUPERCONDUCTING ROTOR WINDING

(75) Inventors: Michael Frank, Uttenreuth (DE); Peter Van Hasselt, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/666,824

(22) PCT Filed: Jun. 24, 2008

(86) PCT No.: PCT/EP2008/058020
§ 371 (c)(1),
(2), (4) Date: Dec. 28, 2009

(87) PCT Pub. No.: WO2009/003877
PCT Pub. Date: Jan. 8, 2009

(65) Prior Publication Data
US 2010/0176667 A1 Jul. 15, 2010

(30) Foreign Application Priority Data
Jun. 29, 2007 (DE) .......................... 10 2007 030 474

(51) Int. Cl.
*H02K 9/00* (2006.01)
*H02K 1/22* (2006.01)

(52) U.S. Cl. ................. 310/52; 310/54; 310/61; 310/64; 310/261.1

(58) Field of Classification Search ................. 310/52, 310/55, 58, 61, 64, 62, 261, 271, 261.1
See application file for complete search history.

(56) References Cited

U.S. PATENT DOCUMENTS

| 4,380,712 A * | 4/1983 | Intichar et al. ................. 310/52 |
| 6,553,773 B2 | 4/2003 | Laskaris |
| 7,012,347 B2 | 3/2006 | Baik et al. |

FOREIGN PATENT DOCUMENTS

| DE | 3015682 A1 | 10/1981 |
| DE | 19938986 A1 | 3/2001 |
| DE | 102004040493 A1 | 3/2006 |

* cited by examiner

*Primary Examiner* — Quyen Leung
*Assistant Examiner* — Jose Gonzalez Quinones
(74) *Attorney, Agent, or Firm* — Henry M. Feiereisen; Ursula B. Day

(57) ABSTRACT

The invention relates to an electric machine (2) comprising a rotor (6) that contains a shaft (18, 22) that is located, when in operation, in the ambient temperature range, and a superconducting rotor winding (30) that is cooled to a cryogenic temperature when in operation and which is arranged on the shaft (18, 22). Said machine also comprises a cooling system (8) for cooling the rotor winding (30), said system comprises a compensation pressure reservoir (50, 64) for a cooling medium (42). In said electric machine, the compensation pressure reservoir (50, 64) is arranged on the shaft (18, 22).

9 Claims, 2 Drawing Sheets

ELECTRICAL MACHINE HAVING COOLING SYSTEM FOR A SUPERCONDUCTING ROTOR WINDING

CROSS-REFERENCES TO RELATED APPLICATIONS

This application is the U.S. National Stage of International Application No. PCT/EP2008/058020, filed Jun. 24, 2008, which designated the United States and has been published as International Publication No. WO 2009/003877 and which claims the priority of German Patent Application, Serial No. 10 2007 030 474.0, filed Jun. 29, 2007, pursuant to 35 U.S.C. 119(a)-(d).

BACKGROUND OF THE INVENTION

The invention relates to an electrical machine having a rotor which contains a superconducting rotor winding which is cooled to cryogenic temperature during operation.

Electrical machines, to be precise generators or electric motors, for example synchronous machines, can nowadays be equipped with superconducting components, for example a rotor winding. A cooling system is required in order to cool the rotor winding down to the operating temperature. A normal embodiment of such cooling systems uses, for example, a so-called thermosiphon and operates with a two-phase cooling medium, for example helium, hydrogen, neon, nitrogen or argon. In general, a corresponding rotor has a cooling chamber which is arranged in the area of the rotor winding and into which liquid cooling medium is introduced, where it is vaporized for cooling and is then fed back to a cold head in order to once again liquefy the cooling medium.

When the machine is being started up, all the components of the machine and of the cooling system are initially at room temperature. After the cooling system has been switched on, the so-called cold heads are cooled down first of all, and the liquefaction of the working gas starts when the temperature is sufficiently low.

Since the density of the working gas increases as the temperature falls, and in particular when it is liquefied, it is known for an appropriately large gas volume to be kept available at room temperature in an external supply container which is fitted to the cooling system in order to ensure that a sufficient amount of liquefied working gas, that is to say liquid coolant, is available during operation of the machine. In the equalization pressure container, the cooling medium is generally at ambient temperature in the gaseous state both during operation and when the machine is at rest. A buffer system such as this results at least in a system which operates "at the push of a button", that is to say the user does not need to worry about replenishment of cooling medium, or allowing cooling medium to escape. In the end, he just has to switch on the machine, including the cooling system, after initial filling.

In order to keep the dead volume, that is to say the cooling circuit volume which is actually not required during operation in an arrangement such as this, small, it is desirable for the initial pressure at room temperature to be as high as possible. The equalization vessel is therefore generally in the form of a pressure container. The equalization pressure container is arranged outside the electrical machine and is connected via an appropriate connecting line to the cooling system, which leads into the rotating rotor of the machine.

Alternatively, it is known for the working gas to be replenished from a reservoir when the machine is being started up. This means that the installation operator has to ensure that the gas is replenished.

When the machine is shut down, the vaporizing working gas must then once again be stored in the supply container, for example a gas cylinder or a pressure vessel, or alternatively must be blown out. Particularly during replenishment and when working gas is escaping, the user must ensure the supply of working gas. In addition, the working gas is generally expensive, which means that blowing out should be avoided. It is therefore also known for the blown-out working gas to be fed back again into a supply cylinder, but this requires the use of an external compressor.

SUMMARY OF THE INVENTION

The object of the present invention is therefore to specify an improved electrical machine having a superconducting rotor winding.

The object is achieved by an electrical machine having a rotor, with the rotor comprising a shaft which is at ambient temperature during operation. Furthermore, the machine contains a superconducting rotor winding which is arranged fixed on the shaft and is cooled to cryogenic temperature during operation. The electrical machine furthermore comprises a cooling system for cooling the rotor winding, wherein the cooling system comprises an equalization pressure container for cooling medium. According to the invention, the equalization pressure container is arranged on the shaft of the rotor of the electrical machine.

The shaft is the part of the machine which has to supply cooling medium during operation. The arrangement of the equalization pressure container directly on the shaft avoids the need for an external connecting line leading to the equalization pressure container. The pressure container that is arranged on the shaft therefore holds the working gas as close as possible to the location where it is also required when the machine is switched on and operated.

The equalization pressure container may, for example, be flange-connected to the shaft, for example at the non-drive end of the electrical machine which is generally unused.

At least in one subsection, the shaft may be in the form of a hollow shaft and may have a cutout there in its hollow area for the equalization pressure container. This refinement of the invention is based on the idea of widening the diameter of an electrical machine shaft which is present in any case, of designing it to be in form of a hollow shaft, or of enlarging the cavity in a hollow shaft which exists in any case, or of using it, in order to arrange the equalization pressure container there. Inter alia, this avoids the need for the additional volume for an external pressure container. The wall thickness of the shaft therefore just needs to be designed to be adequate for its supporting function.

A further material saving is achieved if the cutout mentioned above forms the equalization pressure container. No separate equalization pressure container is therefore used in the hollow shaft and, instead, the hollow shaft is itself used as the equalization pressure container.

The cutout may be cylindrical and concentric with respect to the center longitudinal axis of the rotor, thus allowing the hollow shaft to be configured in a particularly simple form, which is advantageous for the electrical machine.

Since the equalization pressure container must connected to the cooling system by means of a line, in order to allow working gas to be interchanged, the equalization pressure container can also be connected to the cooling system by means of a channel, wherein the channel is a cutout in the rotor. This also saves on separate components for the channel or the connecting line.

The channel may be concentric with respect to the center longitudinal axis of the rotor. In this case as well, the concentric arrangement of the channel results in particularly simple production and advantageous mechanical characteristics for the rotating shaft.

A thermosiphon system generally has a cooling tube, which runs centrally along the center longitudinal axis in the rotor, for transportation of cooling medium into the area of the rotor winding. The equalization pressure container can therefore be designed such that a cooling tube such as this passes through it. The transportation of cooling medium is then not impeded by the equalization container.

In the case of a cooling tube, the connecting channel between the equalization pressure container and the cooling system may concentrically surround the cooling tube.

Since the non-drive end of the rotor is generally unused or is used only for connection of the cooling system, the equalization pressure container can be arranged at the non-drive end of the rotor.

In electrical machines, it is known for the diameter of the non-drive end of the rotor to be reduced in comparison to that of the drive end, since this shaft has only a supporting function and does not transmit torque. As a result of the integration of the equalization pressure container, in the machine according to the invention, the non-drive end of the rotor can have the same diameter as the drive end, which on the one hand offers space for the equalization pressure container and a corresponding cavity, and on the other hand results in the advantage that the bearing shells for the drive-end of the shaft and the non-drive end of the shaft are of the same size, thus simplifying their storekeeping.

When a cooling tube is passed through, the internal volume of the hollow shaft, that is to say the equalization pressure container, can be sealed from the external area, that is to say the atmosphere side, by means of a rotating bushing which is required in any case for this purpose. The equalization pressure container is therefore sealed from the atmosphere at the shaft end.

BRIEF DESCRIPTION OF THE DRAWING

In order to describe the invention further reference is made to the exemplary embodiments in the drawing in which, in each case in the form of a schematic outline sketch.

DETAILED DESCRIPTION OF PREFERRED EMBODIMENTS

Figure 1:
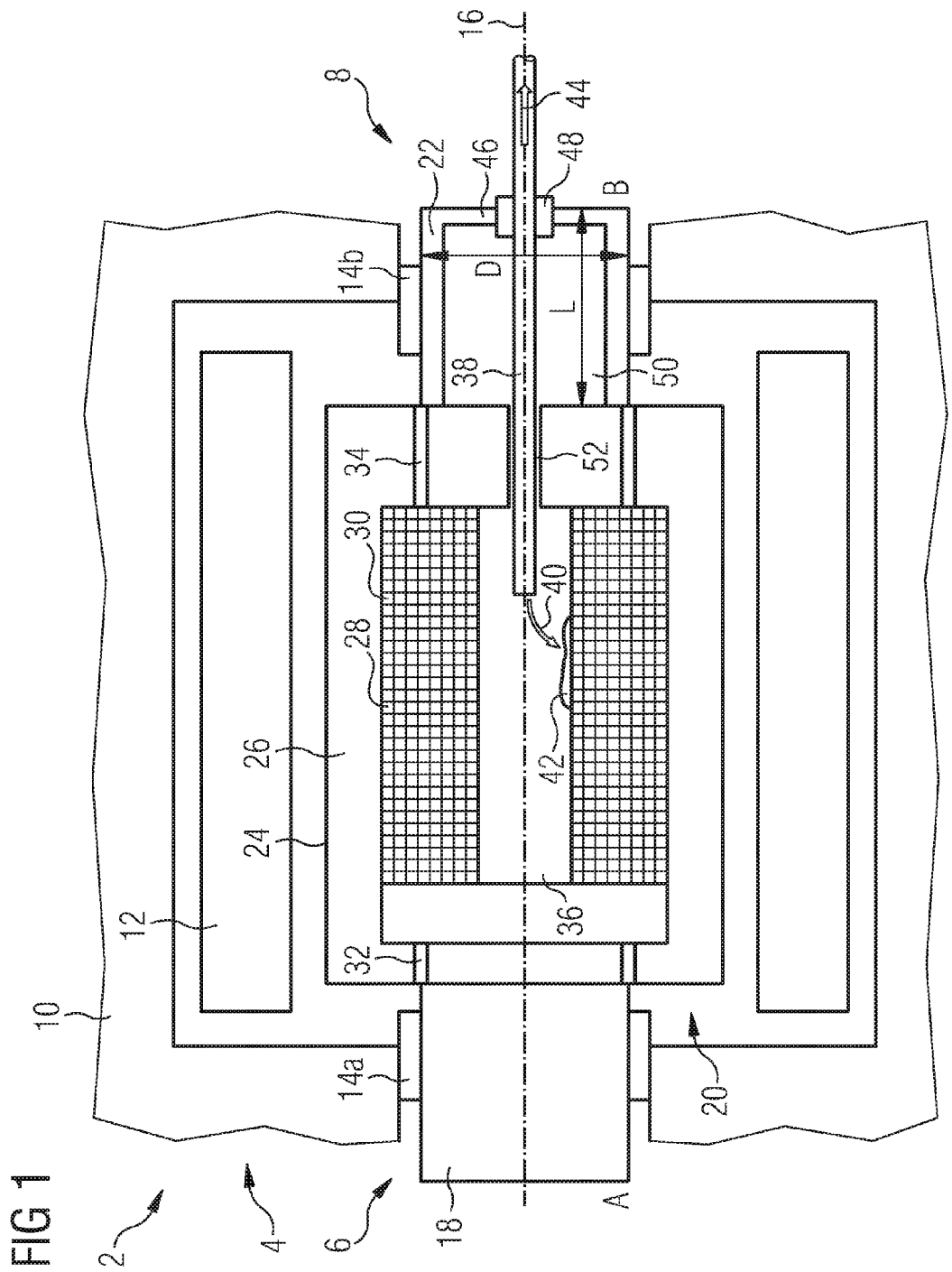
FIG. 1 shows an electrical machine with an equalization container integrated in the rotor.

As an example of an electrical machine, FIG. 1 shows an electric motor 2 with a stator 4, a rotor 6 and a cooling system 8 which acts on the rotor 6.

The stator 4 comprises a stationary stator housing 10 in which a stator winding 12 is firmly anchored. A bearing 14a, 14b is respectively attached both to the drive end A and to the non-drive end B of the electric motor 2 in the stator housing 10, in which bearing 14a, b the rotor 6 is borne such that it can rotate about its center longitudinal axis 16.

At the drive end, the rotor 6 has a drive-end shaft 18, which is fixed in the bearing 14a and is used to emit the torque that is produced by the electric motor 2. The rotor 6 essentially has three subelements which are located one behind the other axially. In the interior of the electric motor 2, the drive-end shaft 18 is connected to a core piece 20 which is firmly connected both to the drive-end shaft 18 and to the non-drive-end shaft 22, which is in turn connected thereto. The non-drive-end shaft 22 is in turn held in the bearing 14b in the stator 4.

The core piece 20 comprises a rotor outer wall 24 which surrounds an insulating vacuum 26. A rotor cold mass 28 is held in the insulating vacuum 26, without touching the rotor outer wall. The rotor cold mass 28 represents, inter alia, the actual superconducting rotor winding 30, which is cooled to cryogenic temperature during operation by the cooling system 8. In order to transmit a torque to the drive-end shaft 18, with this torque being produced on the rotor mass 28 by the electric motor 2, this shaft is connected to the rotor cold mass 28 via a thermally insulating torque transmission element 32. At the non-drive end, the rotor cold mass 28 is connected to the non-drive-end shaft 22, simply for supporting purposes, via a cold part support 34.

The cooling system 8 has a cooling chamber 36 which is arranged centrally with respect to the center longitudinal axis 16 in the rotor cold mass 28. Liquid neon 42 is introduced as a cooling medium at a temperature of about −250° C. into this cooling chamber 48 in the direction of the arrow 40 through a cooling tube 38 which touches the stator 4, and cools the rotor winding 30 in the cooling chamber 36 to a cryogenic temperature, is vaporized there and flows back again through the cooling tube 38 in the direction of the arrow 44. The arrow 40 is therefore the flow direction of the liquid neon, and the arrow 44 that of the gaseous neon. Outside the rotor 6, the cooling tube 38 leads to a cold head, which is not illustrated, and in which the gaseous neon 42 which was made to flow in the direction of the arrow 44 is once again cooled down to liquid neon 42. Since the rotor 6 rotates together with the non-drive-end shaft 22, the stationary cooling tube 38 is borne in the non-drive-end shaft 22 at the non-drive end 46, by means of a gas-tight rotating bushing 48, such that it can rotate about the center longitudinal axis 16.

The cooling system 8 also has a working gas buffer volume 50 which is arranged in the interior of the non-drive-end shaft 22, which is in the form of a hollow shaft. The working gas buffer volume 50 is connected by means of a channel 52, which passes through the rotor outer wall 24 in the direction of the center longitudinal axis 16 and concentrically surrounds the cooling tube 38. In other words, the channel 52 represents a radial gap between the cooling tube 38 and the rotor outer wall 24. Neon 42 can circulate through the channel 52 between the working gas buffer volume 50, which is always at the ambient temperature of the electric motor 2, and the cooling chamber 36.

When the electric motor 2 is started up, all of its parts are initially at ambient temperature. The neon 42 which is located at an increased pressure in the working gas buffer volume 50 then successively diffuses through the channel 52 into the cooling chamber 36 and via the cooling tube 38 to the cold head, which is not illustrated, in order to be successively cooled down there until a sufficient amount of liquid neon 42 is created, and the cooling chamber 36 has been cooled down to a cryogenic temperature.

After the electric motor 2 is switched off, it is once again gradually heated to ambient temperature, as a result of which all the liquid neon 42 is vaporized and flows back via the channel 52 to the working gas buffer volume 50, in order to be stored there.

In one example of the design of the electric motor 2 with regard to non-drive-end shaft 22, this shaft has, for example a length L of 50 cm and a diameter D of 30-40 cm.

Figure 2:
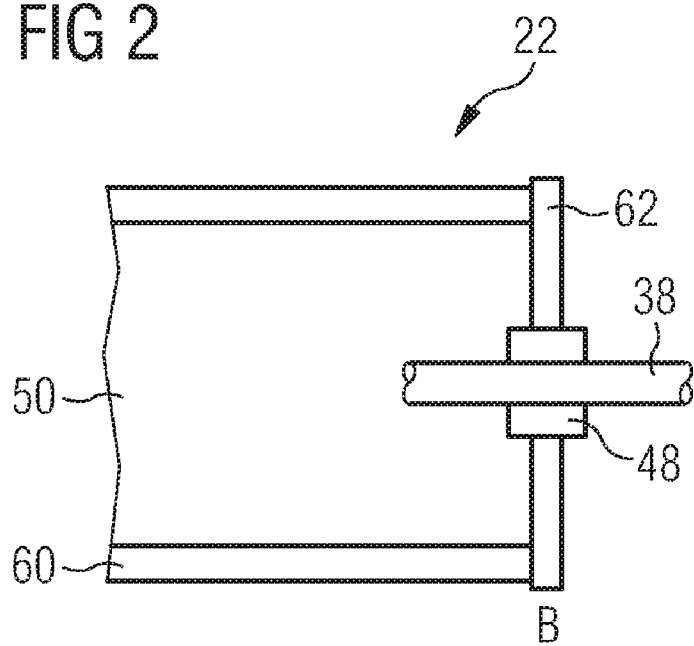
FIG. 2 shows an alternative embodiment for the non-drive-end shaft of the machine shown in FIGS. 1.

In an alternative embodiment, which is shown in FIG. 2, the non-drive-end shaft 22 is formed in two parts, specifically with a cylindrical shaft part 60, to which a flange 62 is connected which supports the rotating bushing 48. A non-drive-end shaft 22 designed in this way can be produced considerably more easily but must be well sealed on the flange 62 in order to prevent neon 42 from being able to escape out of the working gas buffer volume 50.

Figure 3:
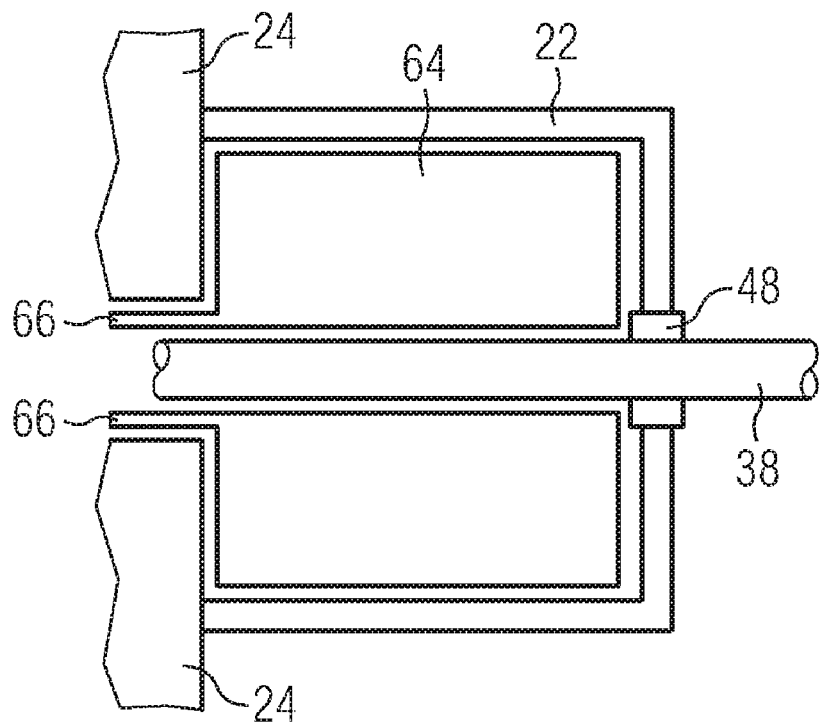
FIG. 3 shows an alternative embodiment with a separate, but integrated, equalization container.

In a further embodiment, which is shown in FIG. 3, the non-drive-end shaft 22 is not itself in the form of a working gas buffer volume 50, and instead the cavity which corresponds to the working gas buffer volume 50 is designed to hold a pressure container 64. The pressure container 64 holds the gaseous neon 42 and is connected to the cooling chamber 36 via a separate connecting line 66. Alternatively, the pressure container 64 can also be connected to the channel 52 from FIG. 1, in a manner which is not illustrated.

What is claimed is:

1. An electrical machine, comprising:
   a rotor having a first shaft on a drive side, a second shaft on a non-drive side, with the first and second shafts being at ambient temperature during operation, a core piece, and a superconducting rotor winding, which is received in the core piece and arranged fixed on the first and second shafts and cooled to a cryogenic temperature during operation, wherein one of the first and second shafts is followed in axial direction by the core piece which in turn is followed in axial direction by the other one of the first and second shafts; and
   a cooling system for cooling the rotor winding, said cooling system including an equalization pressure container for cooling medium, wherein the equalization pressure container is arranged on at least one of the first and second shafts, wherein the at least one of the first and second shafts has at least one subsection constructed in the form of a hollow shaft with a cutout for the equalization pressure container.

2. The electrical machine of claim 1, wherein the cutout forms the equalization pressure container.

3. The electrical machine of claim 1, wherein the cutout has a cylindrical configuration and is placed in concentric relationship to a center longitudinal axis of the rotor.

4. The electrical machine of claim 1, wherein the rotor has a cutout to form a channel connected to the equalization pressure container.

5. The electrical machine of claim 4, wherein the channel is disposed in concentric relationship to a center longitudinal axis of the rotor.

6. The electrical machine of claim 1, wherein the cooling system includes a cooling tube which passes through the equalization pressure container for transportation of cooling medium into an area of the rotor winding.

7. The electrical machine of claim 4, wherein the cooling system includes a cooling tube which passes through the equalization pressure container for transportation of cooling medium into an area of the rotor winding, said channel disposed in concentric surrounding relationship to the cooling tube.

8. The electrical machine of claim 1, wherein the equalization pressure container is arranged at the non-drive end of the rotor.

9. The electrical machine of claim 1, wherein the rotor has at a non-drive end of the rotor a diameter which is the same as a diameter at a drive end of the rotor.

* * * * *